Jan. 17, 1928.
V. DUTKIEWICZ
1,656,578
CLIP FOR TRANSMISSION CABLES WITH CROSSTIES
Filed Aug. 13, 1926
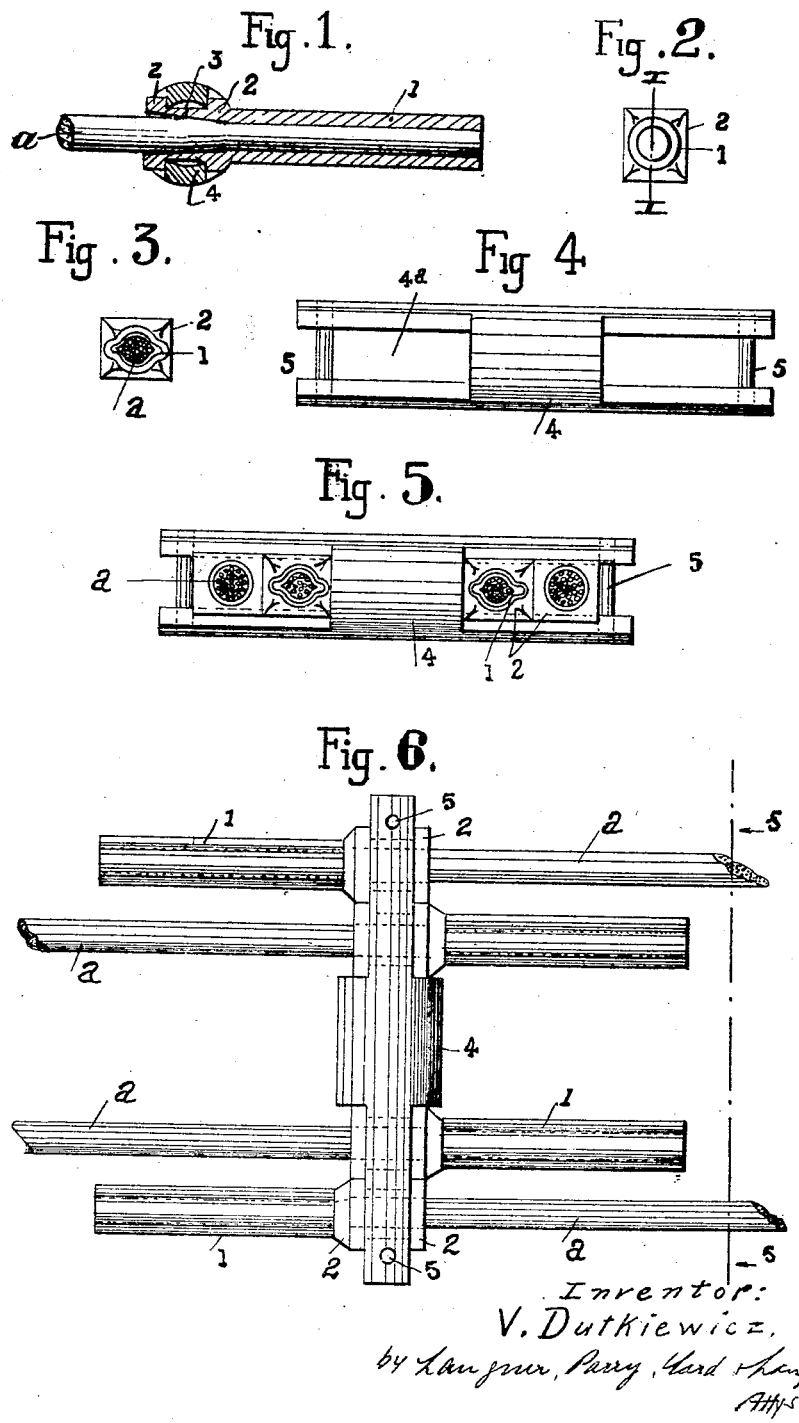
Inventor:
V. Dutkiewicz,
by Langner, Parry, Card & Langner
Attys Patented Jan. 17, 1928.

1,656,578

UNITED STATES PATENT OFFICE.

VALENTIN DUTKIEWICZ, OF PARIS, FRANCE.

CLIP FOR TRANSMISSION CABLES WITH CROSSTIES.

Application filed August 13, 1926, Serial No. 129,056, and in France April 23, 1926.

The present invention relates to transmission systems comprising parallel cables connected at intervals by transverse ties, and has particular reference to systems of this kind in which the cables are divided into lengths or sections which connect together the successive ties and are attached to the latter by means which leave the cable sections free at least as far as the center lines of the cross-ties. This arrangement affords uniform flexibility of the cables for the whole of their length, and obviates any shearing stresses upon the cables at the vicinity of the cross-ties, thus reducing the harshness of the transmission.

The invention has for object to provide an improved form of clip, retaining the above advantages, and of simple and rugged construction, being readily secured to the ends of the cable sections at the exact position desired.

According to this invention, the cable end clip comprises a tubular portion which is slipped over the end of a cable length or section and secured thereon by pinching, crushing or like deformation, effected preferably so as to flatten this tubular portion, in order to bring it to a thickness substantially equal to that of the cable in the plane perpendicular to that of the flight of cables.

In this way, it is easy to secure the clip at the desired position upon the cable. Moreover, the tubular portion wherein the cable is clamped, can be made as long as is required to ensure rigid fixing of the cable in the clip, without, however, giving rise to difficulties in the passage of the clips over the cable pulleys.

The annexed drawing represents, by way of example, a form of construction of the clip device constituting the invention.

Figure 1 is a longitudinal section taken along line I—I of Fig. 2.

Figure 2 is an end view.

Figure 3 is a view similar to the last, after the pinching of the clip upon the cable.

Figure 4 is a longitudinal elevation of the connecting tie.

Figure 5 is a similar view showing the clips in place.

Figure 6 is a corresponding plan.

The clip 1, of tubular shape as a whole, presents towards one of its ends, two cheeks or collars 2 of substantially square shape, designed to embrace the edges of longitudinal slots $4^a$, formed at each end of the cross ties 4 which connect the cables $a$, the part of the clip included between the two cheeks sliding into place in these slotted ends of the tie. The cheeks of the clips in the same slot are then in contact.

Each of the slots receives two clips so disposed as to project on opposite sides of the cross-tie, the two clips placed side by side in the same slot being retained by a pin 5.

The bore of the tubular clips is made to widen out between the axis of the cross-tie and the open end of the clip nearer to the tie, the cable being thereby permitted to remain free at least as far as the said axis. The end of the corresponding cable length is secured in the clip by compressing or pinching the latter beyond the axis of the connecting tie.

The compression or pinching is effected in such a way that the clip is flattened, as seen in Figures 3 and 5, perpendicularly to the common plane of the flight of cables $a$, so that its thickness becomes substantially equal to that of the bare cable.

It will be evident that the invention is not limited to the shapes or to the details described and shown in the drawing, but that suitable modifications may be made within the scope of the appended claims.

What I claim is:

1. In combination with parallel cable trunks, tubular members slidably arranged on the ends of said cable trunks and located thereupon by pressure, transverse connecting elements provided near their ends with longitudinal notches adapted to receive transversely side by side, the tubular elements of the adjacent trunks of the same cable, and means adapted to secure said tubular elements in said notches.

2. In combination with parallel cable trunks, tubular members slidably arranged on the ends of said cable trunks and located thereupon by pressure, transverse connecting elements provided near their ends with longitudinal notches adapted to receive transversely side by side, the tubular elements of the adjacent trunks of the same cable, and means adapted to clamp said tubular elements in said notches, the tubular elements of the adjacent trunks of the same cable being reversely arranged in said connecting means.

3. In combination with parallel cable trunks, tubular elements slidably arranged on the ends of said cable trunks and located thereupon by pressure, transverse connecting elements provided near their ends with longitudinal notches adapted to receive side by side the tubular elements of adjacent trunks of the same cable, each of said tubular elements being provided near its end farthest from the cable trunk to which it is secured, with spaced shoulders, adapted to encompass the sides of the bifurcated portions of the connecting element defined by said notches, and means to retain said tubular elements in said notches.

4. In combination with parallel cable trunks, transverse connecting elements provided with longitudinal notches near their ends, tubular elements secured on the ends of the cable trunks, the bifurcated portions of said connecting elements defined by said notches being fitted over only a part of the length of the tubular elements of the adjacent trunks of the same cable, seated transversely side by side in said notches, each tubular element being fixed on its cable trunk by being flattened in that part of said tubular element which projects transversely beyond said connecting member to a thickness substantially equal to the original thickness of the cable.

In testimony whereof I have signed my name to this specification.

VALENTIN DUTKIEWICZ.